United States Patent [19]

Reilly et al.

[11] 4,008,801

[45] Feb. 22, 1977

[54] GUIDE FOR CONVEYOR BELT

[75] Inventors: James E. Reilly, Bromley; Frank A. Klaene; Michael E. Dunn, both of Fort Mitchell, all of Ky.

[73] Assignee: F. N. Shepard & Company, Cincinnati, Ohio

[22] Filed: June 19, 1975

[21] Appl. No.: 588,521

[52] U.S. Cl. .............................. 198/841; 74/231 C; 198/837
[51] Int. Cl.² ........................................ B65G 15/46
[58] Field of Search ......... 198/193, 202; 74/231 C, 74/231 J

[56] References Cited

UNITED STATES PATENTS

| | | | |
|---|---|---|---|
| 1,442,268 | 1/1923 | Gusdorf | 74/231 J |
| 1,457,569 | 6/1923 | Gusdorf | 74/231 J |
| 1,855,808 | 4/1932 | Schwan | 198/202 |
| 2,870,490 | 1/1959 | Freedlander | 198/202 X |
| 3,186,536 | 6/1965 | Hinchcliffe | 198/202 |
| 3,404,578 | 10/1968 | Koch et al. | 198/193 |

FOREIGN PATENTS OR APPLICATIONS

| | | | |
|---|---|---|---|
| 1,139,936 | 2/1957 | France | 198/202 |
| 46-39621 | 11/1971 | Japan | 198/202 |
| 249,258 | 12/1970 | U.S.S.R. | 74/231 C |

*Primary Examiner*—Evon C. Blunk
*Assistant Examiner*—Richard K. Thomson
*Attorney, Agent, or Firm*—Wood, Herron & Evans

[57] ABSTRACT

A conveyor belt guide comprises a plurality of guide sections, each including an integral polyurethane elongated rib and base web having a width substantially greater than the rib at its juncture with the web. The base web has a fabric backing molded thereon, upon molding of the rib and base web, at the side of the base web opposite the rib. Each section has tapered ends for cooperating with the ends of adjacent sections to prevent guide stripping. The base web has a greater thickness at its juncture to the rib than at its edges, thereby providing a predetermined primary wear area adjacent the rib and a low coefficient of friction between guide section and supporting slide bed. The sections are laid end-to-end into elongated relieved portions of multiple ply conveyor belts so the base web edges are within the belt plane, but the thicker portion of the belt supports the rib above the belt plane. The section rib is transversely notched toward the base web a distance at least one-half the rib height to provide flexibility.

13 Claims, 5 Drawing Figures

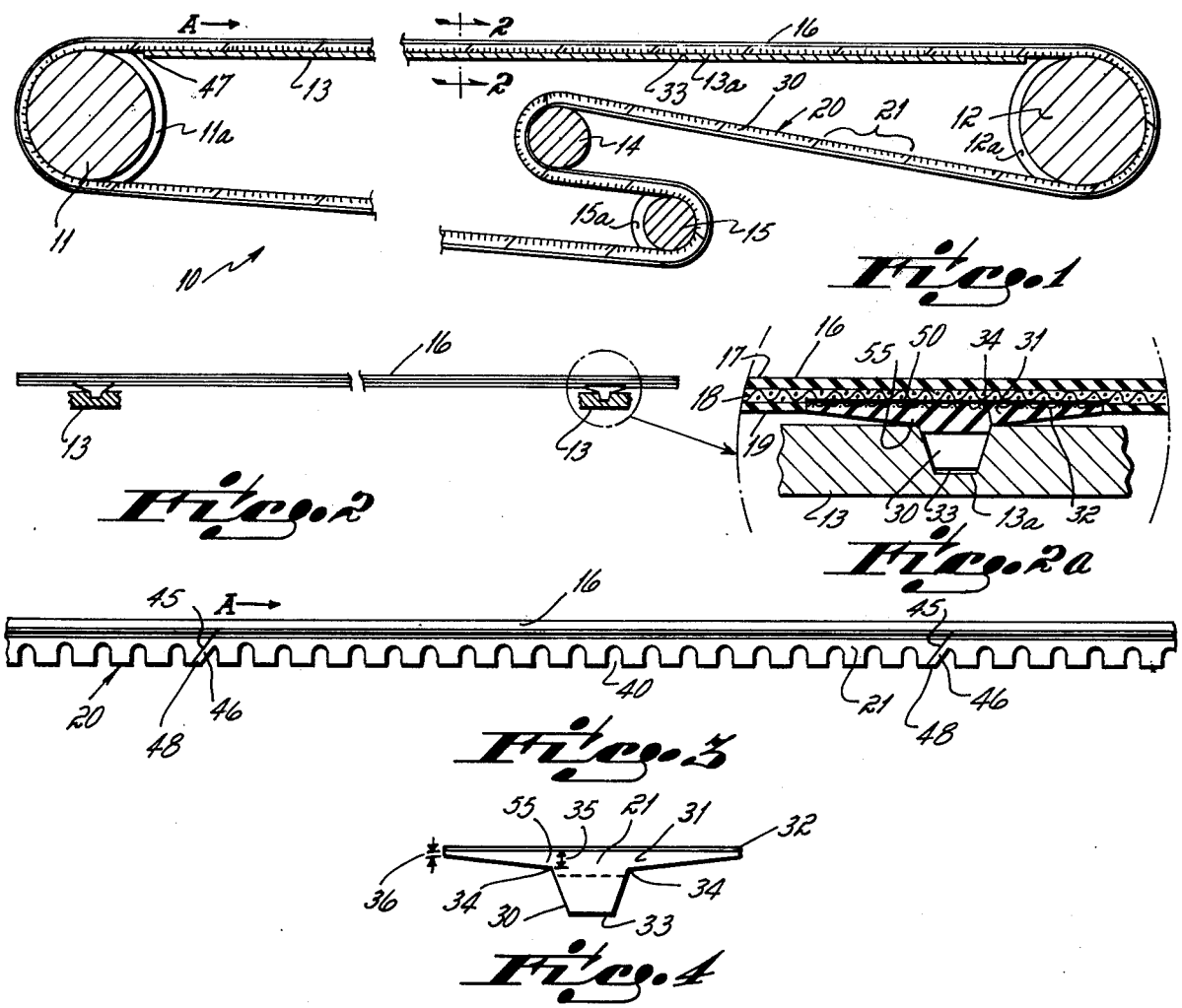

GUIDE FOR CONVEYOR BELT

This invention relates to belt guides and more particularly to guides associated with endless belt conveyors for inhibiting undesired translation of the belts across supporting slider beds and pulleys.

For some time guides in the form of elongated V-shaped ribs have been applied to the underside of conveyor belts in order to keep the belts from shifting across their supporting slides or pulleys. The V-shaped ribs are attached to the underside of the belt and ride in grooves provided in the slides and about the pulleys. Many such guides are in the general configuration of a V-belt with the wider outside forming the base of the rib which is secured to the conveyor belt.

While these devices do provide belt guides which inhibit undesired belt shifting, they are subject to a number of troublesome deficiencies. For example, many of the guides are made from rubber compositions which tend to quickly wear, particularly when the guides are flexed around small diameter pulleys. Guide, or complete belt replacements within only several week's time are not uncommon.

Not only do such guides tend to simply wear quickly as a result of extensive flexing, for example, but they are subject to peeling or stripping from the belt. Typically, the guides are attached to the belt by adhesion along their top surfaces, and even where the guides are outwardly tapered, toward a base from a narrower tip, we have found the bases do not provide sufficient surface area for proper adhesion to the belt.

Further, once a guide becomes worn or damaged, it is difficult to provide an inexpensive replacement which will last for a suitable time unless the complete guide or conveyor belt and guide assembly is replaced.

The utilization of polyurethane as a belting or coating material in certain applications in order to increase resistance or wear has also been known for some time. Polyurethane has not proven suitable, however, as a V-guide for a conveyor belt, since it cannot be adequately adhered by conventional adhesives to belts. The rather small "base" portion of an "A-section" guide configuration, for example, does not provide sufficient surface area for efficient bonding even if polyurethane could be efficiently used.

Accordingly, it has been one objective of the present invention to provide a V-guide for a conveyor belt wherein the guide is wear resistant, provides a relatively large base area for adhesion to a conveyor belt, is easily replaceable in small sections which cooperate with each other to inhibit peeling or stripping from the belt, and contemplates in one embodiment the use of polyurethane guide material and a means for securely adhering the polyurethane to the conveyor belt.

A further objective of the invention has been to provide a polyurethane V-guide for a conveyor belt wherein the guide comprises a plurality of guide sections, each having a leading and a trailing edge for cooperating with adjacent sections to reduce the incidence of stripping or of damage to the guide sections due to the leading edge of a slider plate, a belt scraper or the like.

A further objective has been to provide an improved V-guide for a conveyor belt, the guides comprising polyurethane and having structural features for providing increased flexibility for substantial flexing around small diameter pulleys.

In a preferred embodiment of the invention, a conveyor belt guide includes a plurality of guide sections, each about ten inches in length and including an elongated tapered rib and an integral base web having a width substantially greater than the rib at its junction with the base web. The integral rib and base web are made of polyurethane molded into shape and having a fabric backing applied to the base web opposite the rib during the molding procedure so that the backing is firmly and positively attached to the base web. The section has forward and rearward ends, each tapering rearwardly from base web to rib tip so that the rear end of one section overlaps the forward end of an adjacent following section when the sections are secured to a conveyor belt. The trailing end of a forward section tends to shield the leading end of a rearward section from obstructions and possible guide stripping.

The base web is thicker at its juncture with the rib than at its edges and the section is preferably laid in an elongated, cut-out or relieved portion in the multiple-ply belt; the fabric backing being adhered to an underlying ply by an appropriate adhesive. The thin edge of the section is thus normally within the plane of the belt while the thicker base portion serves to raise the bottom of the rib above the plane of the belt. In this manner, the guide provides its own elongated primary "wear" areas at a thick portion of the base web near the rib.

Transverse notchs are provides in the rib and extend toward the base a distance at least one-half the rib height to provide increased rib flexibility and reduced stress, even when the belt and rib are entrained about a small diameter pulley.

In this manner, polyurethane has thus been made available for use as a wear resistant belt guide while at the same time adhesion interface between the guide and the belt has been greatly increased. Further, damaged or incapacitated guide sections can easily be removed and replaced with new sections, it only being necessary to use a small, inexpensive, replacement section. Also, section replacement is rendered feasible by the tapering of the section ends to prevent stripping by obstructions, and flexibility and stress relief is provided. By tapering the base web thickness, a predetermined "wear" area is defined and provides a lower coefficient of friction than if the complete guide normally conformed to the shape of the supporting and positioning slide bed and groove.

These and other objects and advantages of the present invention will become readily available from the following detailed description of a preferred embodiment and from the drawings in which:

FIG. 1 is a diagrammatic, cross-sectional, elevational view of a typical endless belt conveyor installation in which the invention is used;

FIG. 2 is a cross-sectional view taken along lines 2—2 of FIG. 1;

FIG. 2a is an enlarged view of the encircled portion of FIG. 2;

FIG. 3 is a diagrammatic view showing a belt and three end-to-end guide sections thereon; and FIG. 4 is an elevational view of a belt guide according to the invention.

Turning now to the drawings, the conveyor belt and guide combination is depicted at 10 in FIG. 1, the conveyor belt 16 being shown in a typical conveying installation. Such an installation includes two end pulleys 11 and 12, a conveyor supporting slider bed or plate 13 and conveyor take-up and driving pulleys 14 and 15. As shown in cross-section, each of the pulleys 11, 12 and 15 are provided with grooves 11a, 12a and 15a respectively, for the purpose of receiving conveyor guides as will be hereinafter described. Pulley 14 is not provided with a groove since it engages the top, or the load bearing, side of the conveyor.

Disposed about the various pulleys and the slider plate 13 is a conveyor belt 16 which, as shown in FIG. 2, may be constructed of a plurality of different plies. For example, as shown in FIG. 2a, the conveyor belt may include a load bearing or engaging ply 17, an internal fabric ply 18, and a conveyor belt surface ply 19.

Attached to the conveyor belt 16 are one or more conveyor guides 20 formed from a plurality of conveyor guide sections 21. Guides 20 can be located near the belt edges or centrally of the belt. As shown in FIG. 2, each of the guides rides in a groove 13a of the conveyor's supporting slider plate 13. In the cross-sectional view of FIG. 1, the guide 20 is shown engaging the bottom of the groove 13a. Thus, when the conveyor belt is driven in the direction of Arrow A, the guide 20, which is attached to the belt 16, rides in the various grooves 11a, 12a, 13a and 15a and restricts transverse belt shifting or movement, thereby providing straight line tracking of the belt.

Each of the guide sections 21 comprises a composite of elements as best shown in FIG. 4. More particularly, each guide section 21 includes an elongated tapered rib 30 and an integral base web 31. The rib 30 and the base web 31 are molded as an integral piece, preferably from polyurethane. During the molding operation, a fabric backing 32 of, for example, 15 oz. cotton duck, is applied to the side of the base web 31 opposite the rib 30. Portions of the polyurethane are thus molded into the interstices of the fabric backing so that the backing is securely and positively attached to the polyurethane. It is important that the fabric be securely held to the polyurethane by this method since the fabric provides the adhesive interface with the conveyor belt as will be noted. The fabric backing covers the width of the base web 31.

As shown in FIG. 4, the elongated rib 30 is V-shaped and has a rib tip 33. For purposes of description clarity, the V-rib of the guide in FIG. 4 is a typical "A-section" V-rib guide as shown in the industry. The rib tip 33 is approximately five-sixteenths of an inch wide, and the base of the rib (between the points 34) is approximately ½ inch wide so the base web is substantially wider than the rib at the points 34, 34; about four times as wide as the rib (at its base) in this embodiment. The distance between the rib tip 33, the opposite side of the base web 31 is approximately three-eighths of an inch and it should be noted that the elongated web is located centrally of the edges of the base web 31. Of course, these dimensions are for the purpose of illustration only, and other configurations of ribs could be utilized. For example, B or C-section configuration rib or ribs of other varying shapes could be used and the base web width varied as desired, the web being preferably substantially wider than the rib alone.

It will be further noted that the base web itself has a first thickness designated by the Arrow 35 at its juncture with the rib, and a second edge thickness designated by the Arrows 36 at the edges of the base web 31. In a preferred embodiment, the thickness 36 is about 1/32 inches while the fabric backing 32 is also about 1/32 inches thick, the guide thus having a total edge thickness about 1/16 inches.

The base web is therefore tapered from a thicker portion at the rib junction to a thinner portion at the edges. When the guide section is attached to a conveyor belt, this configuration defines a guide wear area near the junction points 34.

As best seen in FIG. 3, each guide section is provided with a plurality of notches 40 for the purpose of rendering the guide sections flexible and reducing rib and guide section stress when the guides are entrained about small diameter pulleys such as at 14 and 15.

Notches 40 in the preferred embodiment described with respect to FIG. 4 are approximately three-sixteenths of an inch deep from the tip of the rib, and as shown extend toward the base web 31. Each notch is approximately ¼ inch wide and the notches are located throughout the guide section on ½ inch centers. In other configurations the notches extend toward the base a distance of at least one-half the thickness of the integral guide including both rib and base web.

Of further importance to the construction of the guide section, is the fact that each section has tapered or sloping leading and trailing ends or edges 45, 46 respectively. Each leading edge slopes in a rearward direction as shown in FIG. 3 from the base web 31 to the rib 30. Each trailing edge 46 also slopes rearwardly from the base web 31 to the rib 30. The preferred slop angle is about 45°.

As shown in FIGS. 1 and 3, the direction of belt movement is indicated by the Arrow A in each figure. As the belt is drawn about the pulleys, and onto the slider bed 13, it will be noted that it must cross the transverse leading edge 47 of the slider bed. In some endless belt conveyor configurations, the leading edge 47 of the slide forms an obstruction and might have a tendency to engage one of the guide sections 21 and to strip or peel from the conveyor belt. Further, many conveyor installations includes belt scrapers and other cross members and the like which also may present obstructions to the underlying conveyor guide.

In order to prevent the stripping of the guide from the belt, the leading and trailing edges 45, 46 of the guide sections are tapered and the trailing edge of each section is disposed on a slanting member 48 which overlaps the leading edge or end 45 of the following section. When an obstruction is encountered, the slanting member 48 tends to ride over the obstruction and to protect the leading edge of the succeeding sections against being stripped from the belt. Of course, the overlap results from the corresponding abutting slopes of the adjacent ends and does not render the guide any thicker at the abutment. Further, the taper of the leading edge 45 further tends to reduce stripping of the section from the belt.

In use, the guide can be secured to a conveyor belt for use by any appropriate adhesive, the fabric backing of the guide providing that a relatively large and otherwise suitable surface for a secure bond.

In a preferred embodiment, the belt guide 20 is assembled to a multiple-ply conveyor such as that shown at 16 in FIG. 2. The belt 16 as shown has three plies, although a belt having a single or any number of plies can be fitted with the belt guide as described herein.

FIG. 2a depicts in greater detail the manner in which the belt guide of the invention is attached to a multiple-ply conveyor belt. In FIG. 2a, an elongated portion of the surface ply 19 has been removed in order to expose the underlying fabric ply 18. An elongated strip of fabric 18 is thus exposed in a direction parallel to the edge of the belt. An appropriate glue or adhesive 50 is applied to the fabric backing 32 of the guide section 21 and to the internal fabric ply 18 of the belt, whereupon the guide section is laid into the relieved portion of the belt 16 and the fabric backing 32 is adhered to the fabric ply 18 of the belt.

As shown in FIG. 2a, the tapering thickness of the base web 31 tends to define elongated wear areas 55 in the guide section 21 at elongated areas adjacent the juncture 34 of the rib 30 with the base 31. The guides thus tend to ride on the horizontal surface of the slider plate 13 immediately adjacent the groove and, due to the tapered base web, the edges of the guide tend to remain above the slider plate 13. Friction between the guide section 21 and the slider plate 13 is thus reduced to a minimum by the tapered construction of the base web 31.

By virtue of the fact that the base web 31 is substantially wider than the base of the rib 30, the area available for adhesion to the belt is substantially increased and the guide is securely and positively secured to the belt. If, however, the guide section 21 is damaged or stripped from the belt, for example, it can be replaced simply by the addition of a like guide section. Alternately, a damaged or worn section can be simply removed without replacement and without adversely affecting the tracking of the belt.

Since the rib 30 and the integral base 31 is made from a polyurethane material, guide wear is substantially reduced and, in fact, in certain applications the guides have been found to outwear the conveyor belt with which the guides are utilized. Of course, other guide materials could be utilized in conjunction with the guide's other structural features when desired for a particular application.

These and other modifications of the above described embodiments will become readily apparent to those of ordinary skill in the art without departing from the scope of this invention and the applicants intend to be bound only by the claims appended hereto.

We claim:

1. A guide for a conveyor belt having at least one outer surface, said guide comprising
    an elongated rib,
    an elongated base web integral with said rib and having a width greater than said rib, said rib extending outwardly from said base,
    said base web having a first thickness near its juncture with said rib and a thinner second thickness near its respective edges, and
    an elongated fabric backing secured to a side of said base web opposite said rib,
    said guide being attached to said conveyor belt, edges of said guide lying in the plane of said conveyor belt's outer surface, and said base web, at its juncture with said rib, lying outwardly of the plane of said outer surface to provide a predetermined wear area adjacent said rib.

2. A guide as in claim 1 wherein said rib and said base web are polyurethane, said fabric backing being molded onto said base web.

3. A guide as in claim 1 wherein said guide has a forward end and a rearward end, said forward end sloping rearwardly from base to rib and said rearward end sloping rearwardly from base to rib for cooperation with similar immediately adjacent guides to prevent stripping of guides from said conveyor belt.

4. A guide as in claim 3 wherein said slopes are approximately 45°.

5. A guide as in claim 1 wherein said rib includes a plurality of transverse notches extending from a tip of said rib toward said base a distance at least one-half the vertical distance from the tip of the rib to the juncture of the rib with the base.

6. A guide as in claim 5 wherein said notches are approximately one-fourth inches wide and are spaced along said rib at one-half inch centers.

7. A guide as in claim 6 wherein said rib is approximately one-half inch wide at its juncture with said base and is narrower at a tip portion thereof.

8. A guide as in claim 1 wherein the width of the base web is approximately four times the width of the rib at its juncture with the base web.

9. A guide as in claim 2 wherein said guide is polyurethane.

10. An elongated conveyor belt comprising multiple plies of material including a belt surface material and an underlying material, said belt having a belt guide thereon, said guide including a plurality of polyurethane guide sections and each guide section comprising:
    an elongated rib,
    an elongated base web integral with said rib and having a width greater than that of said rib at the juncture of base web and rib, said base web having a first thickness near its juncture with said rib and a thinner second thickness near its respective edges,
    an elongated fabric backing secured to a side of said base web opposite said rib,
    said guide section having a forward end and a rearward end, said forward end sloping rearwardly from base web to rib and said rearward end sloping rearwardly from base web to rib for cooperation with similar immediately adjacent guide sections to prevent stripping of guide sections from said conveyor belt, and
    a longitudinally extending strip of said underlying material of said conveyor belt, and as wide as said base web, being exposed along said belt for adhesion of said fabric backing thereto,
    said guide sections being disposed end-to-end and adhered to said underlying material to form an elongated guide extending in the same direction as the elongation of the belt,
    said belt surface material being of such thickness that the edges of said base web are disposed in approximately the plane of said belt surface material and the base web, at its juncture with said rib, lies outwardly of the plane of said belt surface material to provide a predetermined wear area adjacent said rib.

11. Apparatus as in claim 10 wherein said rib of each guide section includes a plurality of notches, said notches extending from the tip of the rib toward the base web a distance at least equal to one-half the vertical distance between the rib tip and the juncture of the rib to the base web.

12. Apparatus as in claim 10 wherein said fabric backing is molded onto said base web.

13. Apparatus as in claim 10 wherein the rearward end of a forward section overlaps the foward end of an immediately adjacent rearward section.

* * * * *

UNITED STATES PATENT AND TRADEMARK OFFICE
CERTIFICATE OF CORRECTION

PATENT NO. : 4,008,801
DATED : February 22, 1977
INVENTOR(S) : James E. Reilly, et al It is certified that error appears in the above-identified patent and that said Letters Patent are hereby corrected as shown below:

Column 1, line 39, "or" should be --to--.

Column 4, line 28, "slop" should be --slope--.

Signed and Sealed this

Fourth Day of October 1977

[SEAL]

Attest:

RUTH C. MASON
Attesting Officer

LUTRELLE F. PARKER
Acting Commissioner of Patents and Trademarks